Figure 1:
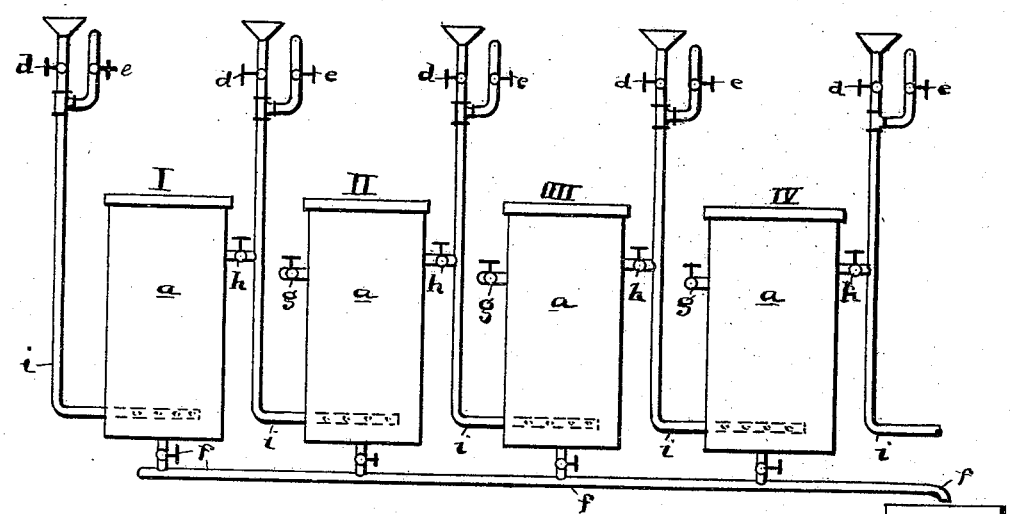

(No Model.)

H. A. FRASCH.
METHOD OR PROCESS OF TREATING SLUDGE.

No. 488,628. Patented Dec. 27, 1892.

ATTEST.
R. B. Moser
N. L. McLane

INVENTOR
Hans A. Frasch
BY
H. J. Fisher
ATTORNEY.

UNITED STATES PATENT OFFICE.

HANS A. FRASCH, OF CLEVELAND, OHIO, ASSIGNOR TO THE GRASSELLI CHEMICAL COMPANY, OF SAME PLACE.

METHOD OR PROCESS OF TREATING SLUDGE.

SPECIFICATION forming part of Letters Patent No. 488,628, dated December 27, 1892.

Application filed April 4, 1892. Serial No. 427,744. (No specimens.)

*To all whom it may concern:*

Be it known that I, HANS A. FRASCH, a citizen of the United States, residing at Cleveland, in the county of Cuyahoga and State of Ohio, have invented certain new and useful Improvements in a Method or Process of Treating Sludge; and I do hereby declare that the following is a full, clear, and exact description of the invention, which will enable others skilled in the art to which it appertains to make and use the same.

My invention has reference to a new and useful method or process of treating what is known as "sludge," a hitherto waste product of oil refineries and paraffine works, and the invention consists in a process of recovering or separating acid and other valuable substances from sludge, or sludge acid, all as hereinafter fully described and particularly pointed out in the claims. The acid has the effect of decomposing and dissolving the impurities from the distilled oil, and, charged more or less with the products taken up from the oil, it separates in a layer which is then drawn off and constitutes the so-called sludge or sludge acid.

My present invention has to do especially with the separation of the several elements or substances which are found in combination in sludge, or sludge acid, of the kind herein described, and of the recovery of the acid, oil, pitch and other substances therein for useful purposes. To this end the sludge or refuse is first placed in a suitable vessel, or a series of vessels or tanks, where it is subjected to the action of cool or cold water, as hereinafter described. If the material be what is known as paraffine sludge, which is of the heavier kind, it is subjected to the action of water at a temperature below the melting point of the resinous matter contained therein; and if the material be what is known as petroleum or benzine sludge, which is comparatively light, the temperature of the water is kept below the evaporating point of the oils contained in this lighter material. In any case only cool or cold water is used to exhaust the free acid, and is found to work to the greatest advantage for this purpose, since the sulphurized or sulphonic combinations of hydro-carbons contained in the sludge, which are not soluble in cold water, remain in the residuum. The treatment with water may be by percolation, leaching, or otherwise, so that the free acid in the material is reached and removed, and the treatment is continued until the free acid contained in the sludge is removed to the degree desired. The acid solution thus obtained from the sludge of one tank or receptacle is but light in density, but I accomplish concentration of the solution, if so desired, by connecting together a series of tanks, and then passing the solution obtained in the first tank through the sludge contained in the second tank, and the solution obtained therein through the sludge of a third or fourth or any number of tanks in succession that be required to concentrate the acid solution to the desired degree of density. When the acid has been removed as much as desired from the sludge contained in each tank in succession by this process, the said tanks in succession are disconnected from the series, and the residuum in the tanks is subjected to further treatment for the purpose of separating and obtaining other valuable substances yet contained in said residuum. To this end I treat the remaining residuum with alkali, or ammonia, or an alkaline salt, or earthy alkali, or its equivalent, under application of heat until the sulphonic acid salts of the hydro-carbons are saturated and go in solution, while the free oils separate and float on the surface as a result of this treatment. The oils are then removed by means of a separator, of any well-known kind, or by other suitable means, and the remaining solution is then purified or treated with a neutral or acrid salt of sodium or other alkali until the resinous matter or pitch separates from the solution. If enough free acid has been left in the first residuum, and the solution after neutralization with alkali or a base whose sulphate salt is soluble in water, is concentrated by means of evaporation, a point of concentration of the sulphate salt, formed by neutralization, is reached at which the pitch or resinous matter separates from the solution without further addition of any other salt or chemical. The pitch or resinous matter separated by this method is then removed from the remaining solution, and concentrated by heat in a suitable furnace. The remaining solution is concentrated to obtain the combinations and salts contained therein.

Figure 2:
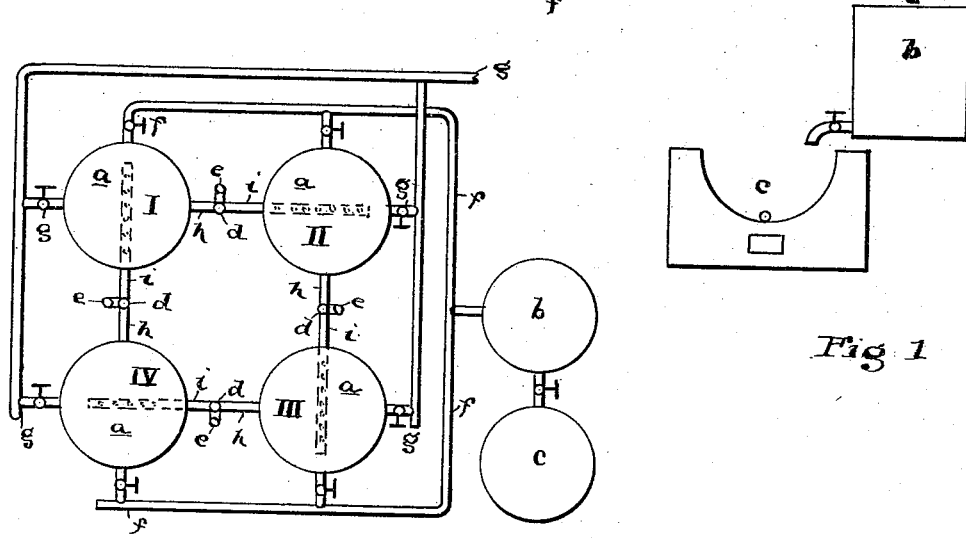

In the accompanying drawings, Figure 1 is a side elevation of a series of tanks connected by means of pipes or tubes, and otherwise equipped as required to make the same operative. Fig. 2 is a plan or diaphragm view of a series of tanks connected and operating as hereinafter described.

The tanks $a$, numbered I, II, III, and IV, respectively, are filled with sludge and cold water is admitted through the valve $d$, and pipe $i$, perforated at its inner end to admit water into the tank. When the tank No. I, is full, the water saturated with whatever acid it has taken up in said tank from the sludge therein, passes through the overflow $h$ into the next succeeding pipe $i$, and thence into tank No. II, and the same operation is repeated from tank No. II to No. III, and from No. III to No. IV, and of course into as many succeeding tanks as may be required to saturate the water with acid to the desired degree, when it is drawn through pipe $g$ into the storage tank. When tank, No. I, has been washed with water long enough so that all free acid in the sludge contained therein is removed, the valves $d$ and $h$ are closed and water is admitted through valve $d$ of the tank No. II, while through the valve $e$ of said tank No. I steam is admitted and the residuum in tank No. I is treated with alkali until all sulphonic hydro-carbons are dissolved and saturated and the free oils float on the surface. The contents of tank No. I are then drawn off through the valve $f$ into the receptacle $b$, leaving tank No. I ready to be refilled with sludge, and, now, to become the last of the system; that is, the tank through which the cold acid water passes last. In the receptacle $b$ the oil is removed from the surface by skimming the solution and the remaining solution is treated with salt until the pitchy substance therein separates, when it is left to settle, and the clear solution of the sulphonic products is drawn off, while the pitch is melted down in the furnace $c$.

This plant as herein shown and described is devised and used for heavy sludge; that is, sludge which is heavier than water. For light sludge, the method of applying the water has to be reversed, and the perforated pipes $i$, now located in the bottom of the several tanks are then placed at the top of the said tanks and the water percolates or filters through the sludge from top to bottom, the water in this case, as before stated, being heavier than the sludge. This is a mere reversal of the means employed, and one or other construction is used, according as the sludge is of the heavier or lighter kind.

The method of separating acid from sludge as hitherto practiced is to add about ten per cent. of water to the sludge and then steam it until the acidity of the water does no more increase. But by this operation not only the free sulphuric acid goes off in solution, but also a large amount of sulphonic hydro-carbon combinations, (combinations in which a radical hydro-carbon takes the place of one equivalent of oxygen of the sulphuric acid.) These sulphonic bodies when mixed with the acid discolor it, and even cause explosion of the acid stills when the point of concentration and temperature is reached at which they decompose. These hydro-carbons are very sparingly soluble in cold water or cold diluted sulphuric acid, but are soluble in hot water or hot diluted sulphuric acid. Hence to separate these combinations I conduct the leaching process cold, and obtain a purer sulphuric acid than can otherwise be obtained, at the same time obtaining the other products, which, if the acid is removed hot, or the leaching be conducted hot, go off with the acid and are destroyed in the course of the concentration of the acid.

What I claim is:

1. The process of recovering and concentrating the sulphuric acid of sludge, which consists in leaching the sludge with water, the temperature of which is below the melting point of heavy sludge and the volatilizing point of light sludge, and then passing the watery product from one tank through the sludge of a series of tanks in succession, the accumulating solution being carried from tank to tank until the desired concentration or density of acid is obtained, substantially as described.

2. The method herein described of treating sludge, which consists in removing the free acid from the sludge by means of cool water, and then subjecting the sludge to the action of an alkaline solution and heat until the remaining sulphonic acid combinations are saturated and brought into solution and the oily substance separated therefrom, substantially as described.

3. The process herein described of treating sludge which consists in removing the free acid by means of cool water, then subjecting the sludge to the action of heat and alkali to liberate the oily substances and neutralize the acid combinations, then drawing off the oil, and at last treating the residuum with a neutral or acid salt which is soluble in water, thereby separating off the resinous or pitchy constituent, substantially as described.

Witness my hand to the foregoing specification this 28th day of March, 1892.

HANS A. FRASCH.

Witnesses:
H. T. FISHER,
NELLIE L. McLANE.